US011203215B2

(12) United States Patent
Hirano et al.

(10) Patent No.: US 11,203,215 B2
(45) Date of Patent: Dec. 21, 2021

(54) TABLET PRINTING APPARATUS, TABLET PRINTING METHOD, TABLET MANUFACTURING APPARATUS, AND TABLET MANUFACTURING METHOD

(71) Applicant: SHIBAURA MECHATRONICS CORPORATION, Yokohama (JP)

(72) Inventors: Azusa Hirano, Yokohama (JP); Hironori Haijima, Yokohama (JP); Junpei Tanaka, Yokohama (JP)

(73) Assignee: SHIBAURA MECHATRONICS CORPORATION, Yokohama (JP)

( * ) Notice: Subject to any disclaimer, the term of this patent is extended or adjusted under 35 U.S.C. 154(b) by 0 days.

(21) Appl. No.: 17/026,427

(22) Filed: Sep. 21, 2020

(65) Prior Publication Data

US 2021/0094331 A1  Apr. 1, 2021

(30) Foreign Application Priority Data

Sep. 30, 2019 (JP) .............................. JP2019-180555
Jul. 15, 2020 (JP) .............................. JP2020-121334

(51) Int. Cl.
*B41F 17/36* (2006.01)
*B41J 3/407* (2006.01)
(Continued)

(52) U.S. Cl.
CPC ............. *B41J 29/393* (2013.01); *A61J 3/007* (2013.01); *B41F 17/36* (2013.01); *B41J 3/407* (2013.01);
(Continued)

(58) Field of Classification Search
CPC . B41J 29/393; B41J 3/407; B41J 13/08; B41J 13/10; B41J 2203/01; B41J 3/4073;
(Continued)

(56) References Cited

U.S. PATENT DOCUMENTS

| 9,033,447 | B2 * | 5/2015 | Morita ..................... B41J 3/407 |
| | | | 347/16 |
| 2004/0094050 | A1 * | 5/2004 | Ackley, Jr. ......... G01N 21/9508 |
| | | | 101/44 |
| 2019/0091990 | A1 | 3/2019 | Ogimoto et al. |

FOREIGN PATENT DOCUMENTS

| CN | 109310576 A | 2/2019 |
| JP | 7-81050 A | 3/1995 |

(Continued)

OTHER PUBLICATIONS

Machine translation of WO 2018003458, published on Jan. 2018 (Year: 2018).*

(Continued)

*Primary Examiner* — Huan H Tran
(74) *Attorney, Agent, or Firm* — Oblon, McClelland, Maier & Neustadt, L.L.P.

(57) ABSTRACT

A tablet printing apparatus 1 includes an inspection unit 53 determining whether or not the printed tablet T is good product, a good product collecting device 43 collecting the tablet T of the good product from the carrying belt 31a, a defective product collecting device 41 collecting the tablet other than the good product from the carrying belt 31a, a discharge confirming sensor 41c detecting whether or not the tablet other than the good tablet is collected by the defective product collecting device 41, and a re-inspection product collecting device 42 collecting the tablet T other than the good product from the carrying belt 31 a when a collecting operation for collecting the tablet T other than the good product is performed by the defective product collecting device 41, and the discharge confirming sensor 41c detects that the tablet T other than the good tablet is not collected.

10 Claims, 2 Drawing Sheets

(51) Int. Cl.
  *B41J 29/393*  (2006.01)
  *B41J 13/08*   (2006.01)
  *B41J 13/10*   (2006.01)
  *B41M 5/00*    (2006.01)
  *A61J 3/00*    (2006.01)

(52) U.S. Cl.
  CPC ............... *B41J 13/08* (2013.01); *B41J 13/10* (2013.01); *B41M 5/0047* (2013.01); *B41M 5/0088* (2013.01)

(58) Field of Classification Search
  CPC ...... B41J 3/543; B41J 11/002; B41J 11/0095; B41M 5/0047; B41M 5/0088; G01N 21/9508; B07C 5/36; A61J 3/007; B41F 17/36
  See application file for complete search history.

(56) References Cited

FOREIGN PATENT DOCUMENTS

| | | | | |
|---|---|---|---|---|
| JP | 2017-136367 A | 8/2017 | | |
| TW | 201811293 A | 4/2018 | | |
| WO | WO 2015/198754 | * 12/2015 | ................ | A61J 3/06 |
| WO | WO 2018-003458 | * 1/2018 | ................ | A61J 3/06 |

OTHER PUBLICATIONS

Machine translation of WO 2015198754, published on Dec. 2015 (Year: 2015).*

* cited by examiner

TABLET PRINTING APPARATUS, TABLET PRINTING METHOD, TABLET MANUFACTURING APPARATUS, AND TABLET MANUFACTURING METHOD

CROSS-REFERENCE TO RELATED APPLICATION

This application is based upon and claims the benefit of priority from Japanese Patent Application No. 2019-180555, filed on Sep. 30, 2019, and Japanese Patent Application No. 2020-121334, filed on Jul. 15, 2020; the entire contents of which are incorporated herein by reference.

FIELD OF THE INVENTION

The embodiments of the present disclosure relate to a tablet printing apparatus, a tablet printing method, a tablet manufacturing apparatus, and a tablet manufacturing method.

BACKGROUND

In order to print identification information (an example of information) such as characters and markings on a tablet, a technique of printing using an inkjet head is known. A tablet printing apparatus using this technique carries a tablet by a carrying device such as a conveyor, ejects ink from each nozzle of an inkjet head arranged above the carrying device toward a tablet passing below the inkjet head, and prints identification information on the tablet.

This tablet printing apparatus performs an inspection on the tablet. In the inspection, the tablet on the belt of the carrying device is imaged by a camera, and based on an acquired image, it is judged whether or not the tablet is acceptable by determining whether there is chipping, cracking, and dirt or not, or whether a posture and position of the tablet to be carried is acceptable for printing or not. Identification information is printed on the tablet that has passed this inspection. In addition, an inspection (good or bad of a printing quality) is performed on a printed tablet. It is determined whether the print pattern indicating the identification information is printed in a predetermined pattern at a predetermined position on the tablet, and the tablet determined to have the print pattern printed in the predetermined pattern at the predetermined position is regarded as the tablet of a good product that has passed the inspection.

According to the above-mentioned inspection result, the tablet printing apparatus blows air to the tablet other than the good product on the belt to remove the tablet other than the good product from the belt. However, due to the blowing of air, the tablet other than the good product may not be completely removed and may remain on the belt as it is. In this case, in addition to the tablet of the good product, the tablet other than the good product are also collected in a good tablet collecting box, so that the tablet other than the good product is mixed in the good tablet collecting box.

Problem to be Solved by the Invention

The problem to be solved by the present disclosure is to provide a tablet printing apparatus, a tablet printing method, a tablet manufacturing apparatus and a tablet manufacturing method capable of preventing the tablet other than the good product from being mixed in a box which collects the tablet of the good product.

SUMMARY OF THE INVENTION

A tablet printing apparatus according to embodiments of the present disclosure includes;
 a carrying belt carrying a tablet;
 a printing head device printing on the tablet carried by the carrying belt;
 an inspection unit determining whether or not the tablet carried by the carrying belt is a good product;
 a good product collecting device collecting the tablet of the good product carried by the carrying belt when the tablet is determined as the good product by the inspection unit;
 a defective product collecting device collecting the tablet other than the good product carried by the carrying belt when the tablet is not determined as the good product by the inspection unit;
 a detecting unit detecting whether or not the tablet other than the good tablet is collected by the defective product collecting device; and
 a re-inspection product collecting device collecting the tablet other than the good product carried by the carrying belt when a collecting operation for collecting the tablet other than the good product is performed by the defective product collecting device, and the detecting unit detects that the tablet other than the good tablet is not collected.

A tablet printing apparatus according to embodiments of the present disclosure includes;
 a carrying belt carrying a tablet;
 a printing head device printing on the tablet carried by the carrying belt;
 a tablet detecting sensor arranged on an upstream side of a carrying direction of the tablet with respect to the printing head device and detecting a position of the tablet;
 an inspection unit determining whether or not the tablet carried by the carrying belt is a good product;
 a defective product collecting device collecting the tablet other than the good product carried by the carrying belt when the tablet is not determined as the good product by the inspection unit;
 a detecting unit arranged on an downstream side of the carrying direction of the tablet with respect to the defective product collecting device and detecting the tablet passed through the defective product collecting device; and
 a re-inspection product collecting device collecting the tablet carried by the carrying belt when the presence of the tablet is detected by the detecting unit even though the tablet is not detected by the tablet detecting sensor.

A tablet printing method according to embodiments of the present disclosure includes the following steps of;
 carrying a tablet by a carrying belt;
 printing, by a printing head device, on the tablet carried by the carrying belt;
 determining, by an inspection unit, whether or not the tablet carried by the carrying belt is a good product;
 collecting, by a good product collecting device, the tablet of the good product carried by the carrying belt when the tablet is determined as the good product by the inspection unit;
 collecting, by a defective product collecting device, the tablet other than the good product carried by the carrying belt when the tablet is not determined as the good product by the inspection unit;
 detecting, by a detecting unit, whether or not the tablet other than the good tablet is collected by the defective product collecting device; and
 collecting, by a re-inspection product collecting device, the tablet other than the good product carried by the carrying belt when a collecting operation for collecting the tablet other than the good product is performed by the defective product collecting device, and the detecting unit detects that the tablet other than the good tablet is not collected.

A tablet manufacturing apparatus according to the embodiment of the present disclosure manufactures a printed tablet by printing on the tablet using the tablet printing apparatus according to the above-described embodiment.

A tablet manufacturing method according to the embodiment of the present disclosure manufactures a printed tablet by printing on the tablet using the tablet printing method according to the above-described embodiment.

According to the embodiments of the present disclosure, it is possible to prevent the tablet other than the good product from being mixed in a box which collects the tablet of the good product.

DETAILED DESCRIPTION OF THE EMBODIMENTS

First Embodiment

The first embodiment will be described with reference to FIGS. 1 and 2.

<Basic Configuration>

Figure 1:
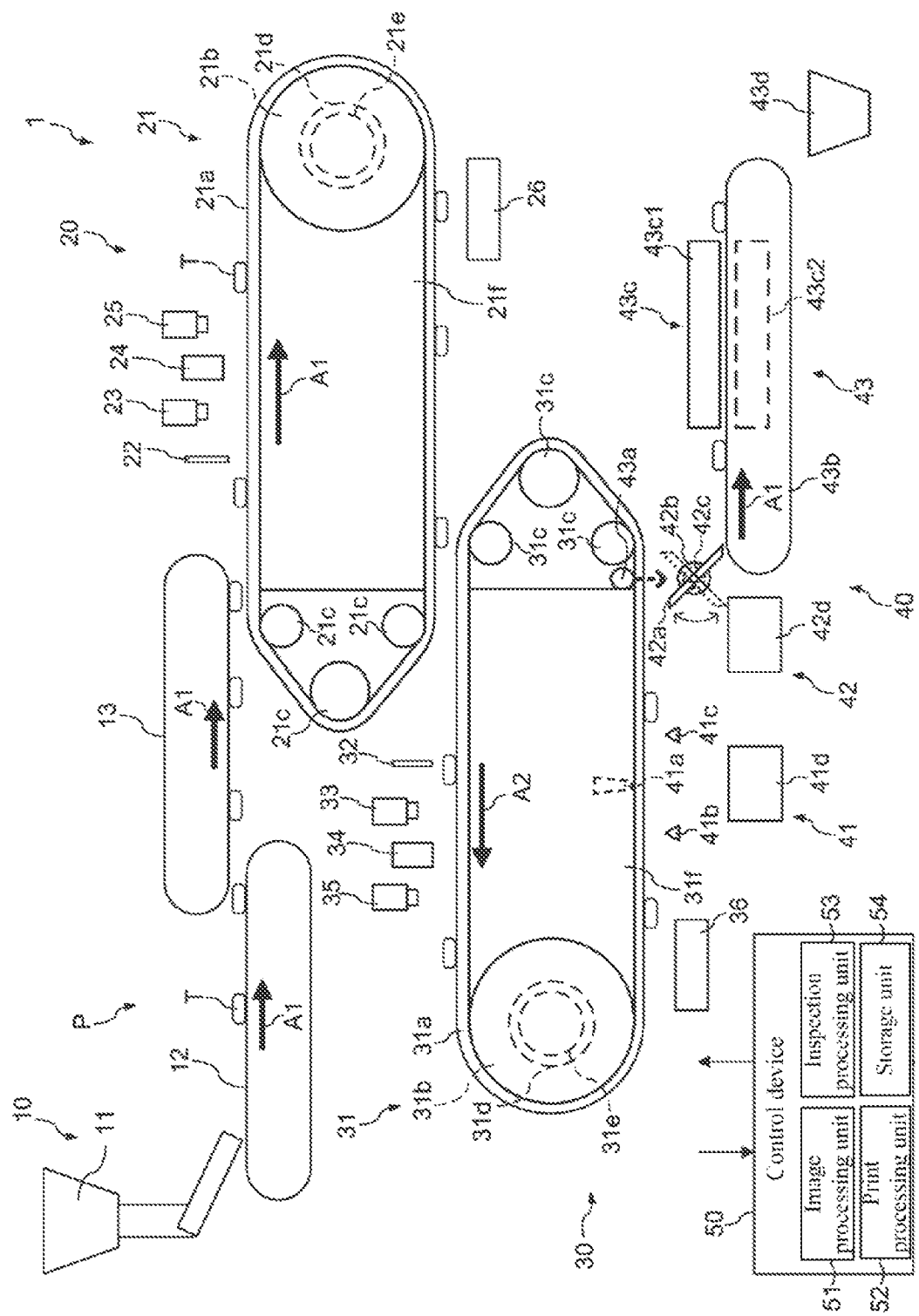
FIG. 1 is a diagram illustrating a tablet printing apparatus according to a first embodiment.

As shown in FIG. 1, a tablet printing apparatus 1 according to an embodiment includes a supplying device 10, a first printing device 20, a second printing device 30, a collecting device 40, and a control device (control unit) 50.

The first printing device 20 and the second printing device 30 have basically the same structure. The supplying device 10, the first printing device 20, the second printing device 30, and the collecting device 40, which are the respective configuration elements of the tablet printing apparatus 1, are arranged in this order, and a carrying path P for tablet T is formed, and a series of processes of supplying, printing, and collecting the tablet T is performed along the carrying path P. That is, the carrying path P is a path through which the tablet T is carried in the tablet printing apparatus 1, an upstream side of the carrying path P is the supplying device 10 side, and the downstream side is the collecting device 40 side. In this embodiment, two parallel carrying paths P are formed.

The supplying device 10 includes a hopper 11, an alignment feeder 12, and a delivery feeder 13. The supplying device 10 is configured to be able to supply the tablet T to be printed to the first printing device 20, and is positioned at one end side of the first printing device 20. The hopper 11 stores a large number of tablets T and sequentially supplies the tablets T to the alignment feeder 12. The alignment feeder 12 aligns the supplied tablets T in two rows and carries them toward the delivery feeder 13. The delivery feeder 13 sequentially sucks, from an upper side of the tablets T, and holds each tablet T arranged in two rows on the alignment feeder 12, and carries each of the held tablets T to the first printing device 20 in two rows and transfers it to the printing device 20. The supplying device 10 is electrically connected to the control device 50, and its drive is controlled by the control device 50. As the alignment feeder 12 and the delivery feeder 13, for example, a belt carrying mechanism may be used.

The first printing device 20 includes a carrying device (carrying unit) 21, a detecting device 22, a first imaging device (an imaging device for printing) 23, a print head device (printing unit) 24, and a second imaging device (an imaging device for inspection) 25 and a drying device 26.

The carrying device 21 includes a carrying belt 21a, a drive pulley 21b, a plurality of (three in the example of FIG. 1) driven pulleys 21c, a motor 21d, a position detector 21e, and a suction chamber 21f. The carrying belt 21a is an endless belt, and is stretched over the drive pulley 21b and each driven pulley 21c. The drive pulley 21b and each driven pulley 21c are rotatably provided in the apparatus main body, and the drive pulley 21b is connected to the motor 21d. The motor 21d is electrically connected to the control device 50, and its drive is controlled by the control device 50. The position detector 21e is a device such as an encoder and is attached to the motor 21d. The position detector 21e is electrically connected to the control device 50, and sends detection signal to the control device 50. The control device 50 may obtain information such as position, speed, and movement amount of the carrying belt 21a based on the detection signal. The carrying device 21 rotates the carrying belt 21a together with each driven pulley 21c by the rotation of the drive pulley 21b by the motor 21d, and carries the tablet T being on the carrying belt 21a in a direction of an arrow A1 (a carrying direction A1) in FIG. 1.

Figure 2:
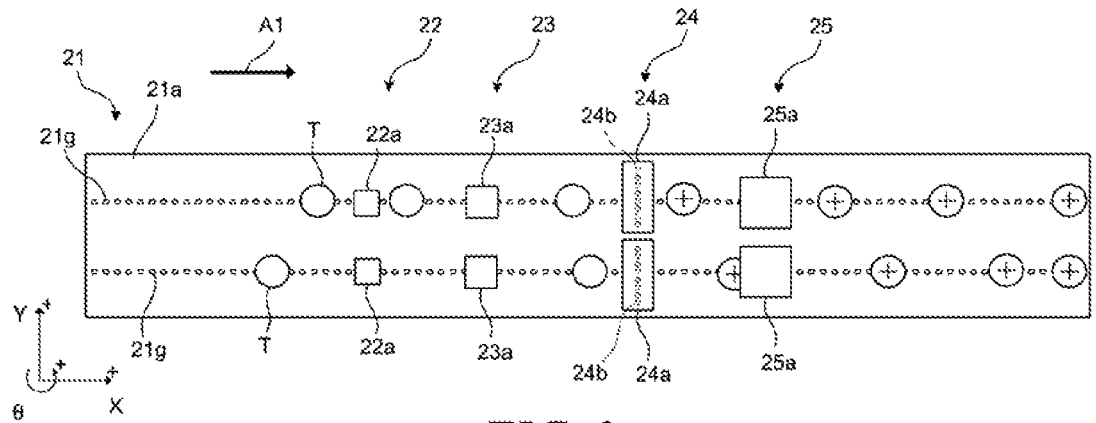
FIG. 2 is a plan view illustrating a first printing apparatus according to the first embodiment.

As shown in FIG. 2, a plurality of circular suction holes 21g are formed on a surface of the carrying belt 21a. These suction holes 21g are through-holes for adsorbing the tablet T respectively on the surface of the carrying belt 21a, and are arranged in two rows in parallel along the carrying direction A1 so as to form two carrying paths P. Each suction hole 21g is connected to an inside of the suction chamber 21f via a suction path formed in the suction chamber 21f, and the suction force may be obtained by the suction chamber 21f. An intake device such as a pump is connected to the suction chamber 21f via an intake pipe (neither is shown), and the inside of the suction chamber 21f is depressurized by an actuation of the intake device. The intake pipe is connected to an approximate center of a side surface (a surface parallel to the carrying direction A1) of the suction chamber 21f. The intake pipe is electrically connected to the control device 50, and its drive is controlled by the control device 50.

The detecting device 22 has a plurality of detecting units 22a (two in the example of FIG. 2). The detecting units 22a are arranged one by one for each of the carrying paths P on a downstream side of the carrying direction A1 with respect to the position where the tablet T is supplied on the carrying belt 21a by the supplying device 10 and in a direction that intersects the carrying direction A1 in a horizontal plane (for example, an orthogonal direction), and is provided above the carrying belt 21a. The detection unit 22a detects a position of the tablet T on the carrying belt 21a (a position of the tablet T in the carrying direction A1) by projecting and receiving light of laser light, and functions as a trigger sensor of each device located downstream. Various laser sensors such as a reflection type laser sensor may be used as the detecting unit 22a. Each detecting unit 22a is electrically connected to the control device 50, and sends detection signal to the control device 50.

The first imaging device 23 has a plurality of imaging units 23*a* (two in the example of FIG. 2). The imaging units 23*a* are arranged one by one for each of the carrying paths P on the downstream side of the carrying direction A1 with respect to the position where the detecting unit 22 is arranged and in a direction that intersects the carrying direction A1 in a horizontal plane (for example, an orthogonal direction), and is provided above the carrying belt 21*a*. The imaging unit 23*a* performs imaging at the timing when the tablet T reaches directly below the imaging unit 23*a* based on the position information of the tablet T described above, and acquires an image (an image for printing) including the upper surface of the tablet T, and sends the acquired image to the control device 50. As the imaging unit 23*a*, various cameras having an image sensor such as CCD (charge-coupled device) or CMOS (complementary metal oxide semiconductor) may be used. Each imaging unit 23*a* is electrically connected to the control device 50, and their drives are controlled by the control device 50. If necessary, lighting for imaging is also provided.

The printing head device 24 has a plurality of printing heads 24*a* (two in the example of FIG. 2) in inkjet system. The printing heads 24*a* are arranged one by one for each of the carrying paths P on the downstream side of the carrying direction A1 with respect to the position where the first imaging device 23 is arranged and in a direction that intersects the carrying direction A1 in a horizontal plane (for example, an orthogonal direction), and is provided above the carrying belt 21*a*. The print head 24*a* includes a plurality of nozzles 24*b* (eight in the example of FIG. 2, but actually several hundreds to thousands), and ejects ink individually from these nozzles 24*b*. The print head 24*a* is provided so that an alignment direction in which the nozzles 24*b* are aligned intersects with the carrying direction A1 in a horizontal plane (for example, orthogonal direction). As the print head 24*a*, various inkjet print heads having a driving element such as a piezoelectric element, a heating element, or a magnetostrictive element may be used. Each printing head 24*a* is electrically connected to the control device 50, and their drives are controlled by the control device 50.

The second imaging device 25 has a plurality of imaging units 25*a* (two in the example of FIG. 2). The imaging units 25*a* are arranged one by one for each of the carrying paths P on the downstream side of the carrying direction A1 with respect to the position where the printing head device 24 is arranged and in a direction that intersects the carrying direction A1 in a horizontal plane (for example, an orthogonal direction), and is provided above the carrying belt 21*a*. The imaging unit 25*a* performs imaging at the timing when the tablet T reaches directly below the imaging unit 25*a* based on the position information of the tablet T described above, and acquires an image (an image for inspection) including the upper surface of the tablet T, and sends the acquired image to the control device 50. As the imaging unit 25*a*, similar to the imaging unit 23*a* described above, various cameras having an image sensor such as CCD or CMOS may be used. Each imaging unit 25*a* is electrically connected to the control device 50, and their drives are controlled by the control device 50. If necessary, lighting for imaging is also provided.

Returning to FIG. 1, the drying device 26 is positioned on the downstream side of the carrying direction A1 with respect to the position where the printing head device 24 is provided, and, for example, is provided below the carrying device 21. The drying device 26 is a drying device common to the two rows of the carrying paths P, and dries the ink applied to each tablet T on the carrying belt 21*a*. As the drying device 26, various kinds of drying units such as a blower for drying with a gas such as air, a heater for drying with radiant heat, or a blower for drying with warm air or hot air in combination with gas and a heater may be used. The drying device 26 is electrically connected to the control device 50, and its drive is controlled by the control device 50.

The tablet T that has passed above the drying device 26 is carried along with the movement of the carrying belt 21*a*, and reaches a position near the end of the carrying belt 21*a* on the side of each driven pulley 21*c*. At this position, the suction action does not work on the tablet T, the tablet T is released from the state of being held by the carrying belt 21*a*, and is transferred from the first printing device 20 to the second printing device 30.

The second printing device 30 includes a carrying device 31, a detecting device 32, a first imaging device (an imaging device for printing) 33, a print head device 34, a second imaging device (an imaging device for inspection) 35, and a drying device 36. The carrying device 31 includes a carrying belt 31*a*, a drive pulley 31*b*, a plurality of (three in the example of FIG. 1) driven pulleys 31*c*, a motor 31*d*, a position detector 31*e*, and a suction chamber 31*f*. Note that each element that constitutes the second printing apparatus 30 has basically the same structure as the configuration elements corresponding to the first printing apparatus 20 described above, and therefore a description thereof will be omitted. The carrying direction of the second printing device 30 is a direction of an arrow A2 (a carrying direction A2) in FIG. 1.

The collecting device 40 includes a defective product collecting device 41, a re-inspection product collecting device 42, and a good product collecting device 43. This collecting device 40 is positioned on a downstream side of the carrying direction A2 with respect to the position where the drying device 36 of the second printing device 30 is provided. The collecting device 40 basically collects the tablet T of the defective product by the defective product collecting device 41, collects the tablet T of the re-inspection product (described later) by the re-inspection product collecting device 42, and collects the tablet T of the good product by the good product collecting device 43.

The defective product collecting device 41 includes a plurality of spraying nozzles 41*a*, a plurality of discharging sensors 41*b*, a plurality of discharge confirming sensors (detecting units) 41*c*, and a storage box (collecting box) 41*d*. The discharging sensor 41*b*, the spraying nozzle 41*a*, and the discharge confirmation sensor 41*c* are provided for each carrying path P, and the storage box 41*d* is commonly provided for each carrying path P.

The spraying nozzle 41*a* are arranged one by one for each of the carrying paths P in a direction that intersects the carrying direction A1 in a horizontal plane (for example, an orthogonal direction), and is provided inside the suction chamber 31*f* of the second printing device 30. The spraying nozzle 41*a* sprays gas (for example, air) toward the carrying belt 31*a*, and lets the tablet T drop from the carrying belt 31*a*. At this time, the gas sprayed from the spraying nozzle 41*a* passes through the suction holes (similar to the suction holes 21*g* shown in FIG. 2) of the carrying belt 31*a* and hits the tablet T. The spraying nozzle 41*a* is electrically connected to the control device 50, and its drive is controlled by the control device 50.

The installation position of the spraying nozzle 41*a* may be other than inside the suction chamber 31*f* of the second printing device 30, and for example, the spraying nozzle 41a may be provided below the carrying device 31 and may spray gas toward a side surface of the tablet T carried by the carrying belt 31a. At this time, the spraying nozzle 41a may be provided so as to be inclined with respect to the vertical direction. In this case, the storage box 41d is provided in consideration of a gas spraying direction of the spraying nozzle 41a.

The discharging sensor 41b are arranged one by one for each of the carrying paths P on an upstream side of the carrying direction A2 with respect to the position where the spraying nozzle 41a is arranged and in a direction that intersects the carrying direction A2 in a horizontal plane (for example, an orthogonal direction), and is provided below the carrying device 31. The discharging sensor 41b is present on an entrance side of the defective product collecting device 41 and detects the presence or absence of the tablet T on the carrying belt 31a by projecting and receiving light of laser light. Various laser sensors such as a reflection type laser sensor may be used as the discharging sensor 41b. Each discharging sensor 41b is electrically connected to the control device 50 respectively, and sends detection signal to the control device 50.

The discharge confirming sensor 41c are arranged one by one for each of the carrying paths P on a downstream side of the carrying direction A2 with respect to the position where the spraying nozzle 41a is arranged and in a direction that intersects the carrying direction A2 in a horizontal plane (for example, an orthogonal direction), and is provided below the carrying device 31. The discharge confirming sensor 41c is present on an exit side of the defective product collecting device 41 and detects the presence or absence of the tablet T on the carrying belt 31a by projecting and receiving light of laser light. Various laser sensors such as a reflection type laser sensor may be used as the discharge confirming sensor 41c. Each discharge confirming sensor 41c is electrically connected to the control device 50 respectively, and sends detection signal to the control device 50.

The storage box 41d is provided directly below each spraying nozzle 41a and below the carrying device 31. This storage box 41d receives and stores the tablet T dropped from the carrying belt 31a by the gas sprayed from the spraying nozzle 41a.

The re-inspection product collecting device 42 includes a shutter 42a, a motor 42b, a shutter detecting unit 42c, and a storage box (collecting box) 42d. This re-inspection product collecting device 42 is positioned on the downstream side of the carrying direction A2 with respect to the position where the defective product collecting device 41 is provided, and the shutter 42a and the storage box 42d are provided commonly to the respective carrying paths P.

The shutter 42a is provided at the end of the carrying belt 31a on the side of each driven pulley 31c, that is, directly below the position where the tablet T drops from the carrying belt 31a. The shutter 42a is formed, for example, in a rectangular shape. The width direction of the shutter 42a (a direction orthogonal to the carrying direction A1 in the horizontal plane) is the longitudinal direction, and the length in the width direction is substantially the same as the length in the width direction of the carrying belt 31a. The shutter 42a is rotatably provided by a motor 42b, and a rotation shaft of the motor 42b is attached to a center of the shutter 42a in a short-length direction. The motor 42b is a motor capable of normal rotation and reverse rotation. The motor 42b is electrically connected to the control device 50, and its drive is controlled by the control device 50.

By the rotation operation by the motor 42b, the shutter 42a delivers the tablet T dropped from the carrying belt 31a to the good product collecting device 43 in an open state where the shutter 42a forms a part of the carrying path P (the state in which the shutter 42a is inclined so as to gradually approach the good product collecting device 43: the state of the shutter 42a indicated by the solid line in FIG. 1), and delivers the tablet T dropped from the carrying belt 31a to the storage box 42d in a closed state where the carrying path P is shut (the state in which the shutter 42a is inclined so as to gradually approach the storage box 42d: the state of the shutter 42a indicated by the broken line in FIG. 1). That is, the shutter 42a is provided being openable and closable so as to be in the open state where the tablet T is delivered to the good product collecting device 43 and the closed state where the tablet T is delivered to the storage box 42d.

The shutter detecting unit 42c detects a stop position of the shutter 42a and detects whether or not the shutter 42a is in the closed state. Normally, the shutter 42a is kept in the open state. Therefore, the shutter detecting unit 42c detects that the stop position of the shutter 42a is a predetermined stop position at which the shutter 42a is in the closed state, and detects that the shutter 42a is in the closed state. As the shutter detecting unit 42c, for example, a rotary encoder is used. The shutter detecting unit 42c is electrically connected to the control device 50, and sends detection signal to the control device 50.

The storage box 42d is positioned between the storage box 41d of the defective product collecting device and the good product collecting device 43, and is provided below the carrying device 31. This storage box 42d receives and stores the tablet T delivered from the shutter 42a.

The good product collecting device 43 includes a gas blowing unit 43a, a discharging/carrying unit 43b, a drying device 43c, and a storage box (collecting box) 43d. This good product collecting device 43 is positioned on the downstream side of the carrying direction A2 with respect to the position where the re-inspection product collecting device 42 is provided, and the gas blowing unit 43a, the drying device 43c, and the storage box 43d are provided commonly to the respective carrying paths P.

The gas blowing unit 43a is provided inside the suction chamber 31f of the second printing device 30 and at the end of the carrying device 31, that is, at the end of the carrying belt 31a on the side of each driven pulley 31c. For example, during a printing process, the gas blowing unit 43a constantly blows gas (for example, air) toward the carrying belt 31a, and lets the tablet T drop from the carrying belt 31a. At this time, the gas blown from the gas blowing unit 43a passes through the suction holes (similar to the suction holes 21g shown in FIG. 2) of the carrying belt 31a and hits the tablet T. For example, an air blow having a slit-shaped opening extending in a direction intersecting the carrying direction A2 in a horizontal plane (for example, an orthogonal direction) may be used as the gas blowing unit 43a. The gas blowing unit 43a is electrically connected to the control device 50, and its drive is controlled by the control device 50.

Here, the tablet T that has passed through the defective product collecting unit 41 is carried along with the movement of the carrying belt 31a, and reaches the position near the end of the carrying belt 31a on the side of each driven pulley 31c. At this position, the suction action does not work on the tablet T, however gas is blown onto the tablet T from above the tablet T by the gas blowing unit 43a, and the tablet T drops from the carrying belt 31a. Therefore, by providing the gas blowing unit 43a, the tablet T can be reliably dropped from the carrying belt 31a. When the shutter 42a of the re-inspection product collecting device 42 is in the open state, the tablet T dropped from the carrying belt 31a reaches the upper surface of the shutter 42a and moves along the upper surface due to the inclination of the upper surface, and flows into the discharging/carrying unit 43b. On the other hand, when the shutter 42a is in the closed state, the tablet T dropped from the carrying belt 31a reaches the upper surface of the shutter 42a, moves along the upper surface due to the inclination of the upper surface, and flows into the storage box 42d.

The discharging/carrying unit 43b receives the tablets T flowing from the shutter 42a, and carries the received tablets T in two rows or in two or more rows to the storage box 43d. As the discharging/carrying unit 43b, for example, a belt carrying mechanism may be used. A belt of the discharging/carrying unit 43b (good product carrying belt) is an endless belt having gas permeability. As the belt with gas permeability, a belt made of various materials having a plurality of through holes, such as a mesh belt or a belt having a plurality of round holes, may be used. The discharging/carrying unit 43b is electrically connected to the control device 50, and its drive is controlled by the control device 50.

There is a difference between a carrying speed of the second printing device 30 and a carrying speed of the good product collecting device 43. Specifically, the carrying speed of the good product collecting device 43 is slower than the carrying speed of the second printing device 30. As a result, it is possible to gain time to completely dry the ink printed on the tablet T upon the good product collecting device 43.

Further, an inclination angle of the shutter 42a and a length of the shutter 42a are adjusted according to the speed difference between the belt of the discharging/carrying unit 43b and the carrying belt 31a of the second printing device 30, and it is set so as to let a moving speed and a carrying distance of the tablet T moving on an inclined surface which is the upper surface of the shutter 42a appropriate, that is, to enable a smooth carrying by suppressing a rolling and dropping of the tablet T, also to prevent the ink coating of the tablet T being peeled off due to the impact of dropping or the collision between the tablets T, or to prevent the inks of the tablet T being transferred to each other, or the ink of the tablet T being transferred to the belt by the impact of dropping.

Further, as described above, when the carrying speed of the tablet T in the good product collecting device 43 is slower than the carrying speed of the tablet T in the second printing device 30, the tablets T is successively supplied on the belt of the good product collecting device 43, and the tablet T dropped from the carrying belt 31a is likely to collide with the tablet T present in the good product collecting device 43. In such a case, the impact when the dropped tablet T collides with the belt may be weakened by making the slope of the shutter 42a gentle and increasing the length of the shutter 42a along the carrying direction A1.

The drying device 43c has an upper drying unit 43c1 and a lower drying unit 43c2. The drying device 43c uses a dry gas (for example, dry air) to dry the tablet T carried by the discharging/carrying unit 43b by the upper drying unit 43c1 and the lower drying unit 43c2. The upper drying unit 43c1 is provided above the discharging/carrying unit 43b, and blows the dry gas downward from the position above the discharging/carrying unit 43b. The lower drying unit 43c2 is provided inside the discharging/carrying unit 43b, and blows the dry gas upward from the position inside the discharging/carrying unit 43b. The upper drying unit 43c1 and the lower drying unit 43c2 are electrically connected to the control device 50, and their drive is controlled by the control device 50. As the upper drying unit 43c1 and the lower drying unit 43c2, in addition to a device for drying with dry gas, various kinds of drying units such as a blower for drying with a gas such as air, a heater for drying with radiant heat, or a blower for drying with warm air or hot air in combination with gas and a heater may be used.

The storage box 43d is positioned at the downstream end of the discharging/carrying unit 43b, that is, at the end of the discharging/carrying unit 43b opposite to the second carrying device 31 side, and is provided outside the housing of the tablet printing apparatus 1. The storage box 43d receives the tablet T, the ink of which has been dried by the drying device 43c, from the discharging/carrying unit 43b and stores it.

The control device 50 includes an image processing unit 51, a print processing unit 52, an inspection processing unit (inspection unit) 53, and a storage unit 54. The image processing unit 51 processes an image. The print processing unit 52 performs processing relating to printing. The inspection processing unit 53 performs processing relating to inspection (details will be described later). The storage unit 54 stores various information such as processing information and various programs. Such a control device 50 controls the supplying device 10, the first printing device 20, the second printing device 30, and the collecting device 40, and also receives the position information of the tablet T transmitted from the respective detecting devices 22, 32 of the first printing device 20 and the second printing device 30, and the image transmitted from the respective imaging device 23, 25,33,35 of the first printing device 20 and the second printing device 30, the detection signals transmitted from the respective sensors 41b, 41c of the defective product collecting device 41 of the collecting device 40, and the like. The operating conditions are set in advance and stored in the storage unit 54. The control device 50 controls the defective product collecting device 41 and the re-inspection product collecting device 42 of the collecting device 40 based on the operating conditions stored in the storage unit 54.

(Collecting Operation of Defective Products and Re-Inspection Products)

Next, the collecting operation of the defective product collecting device 41 and the collecting operation of the re-inspection product collecting device 42 will be described. For example, based on the operating conditions, the defective product collecting device 41 executes the collecting operation of performing blow (gas spray) by each spraying nozzle 41a, and the re-inspection product collecting device 42 executes the collecting operation of opening and closing the shutter 42a. Each sensor (the detecting unit 22a of the detecting device 22, the detecting unit of the detecting device 32, the discharging sensor 41b, and the discharge confirming sensor 41c) is normally in the OFF state, and when the tablet T is detected, it is turned on (pulse waveform). The individual ON/OFF information of each sensor is stored for controlling the collecting operation by the blowing and the shutter 42a.

When the target tablet T is a defective product as a result of the inspection, blowing is performed. The blowing is executed at the timing of the target tablet T reaches directly below the spraying nozzle 41a based on the detection result by the detecting unit of the detecting device 32 (which is similar to the detecting unit 22a of the detecting device 22 and is also referred to as "tablet detecting sensor"). The performing of this blowing is for removing the target tablet T from the carrying belt 31a. In the case that the discharge confirming sensor 41c is ON when the position where the blowing is performed on the carrying belt 31a is moved to the discharge confirming position by the discharge confirming sensor 41c, in order to prevent tablet T other than the good product from being collected by the good product collecting device 43, the shutter 42a is closed to be in the closed state. When the target tablet T is passed by the shutter 42a to the storage box 42d of the re-inspection product collecting device 42, the shutter 42a is opened to be in the open state. That is, the shutter 42a is basically kept in the open state. In addition, after the blowing, in the case that the discharge confirming sensor 41c is OFF when the position where the blowing is performed on the carrying belt 31a is moved to the discharge confirming position by the discharge confirming sensor 41c, the tablet T has been successfully removed, and the shutter 42a remains open. It should be noted that when a predetermined time (a time required for delivering the tablet T to the storage box 42d, which is obtained in advance by an experiment) has elapsed after the shutter 42a is closed, the shutter 42a is set to be opened assuming that the target tablet T has been delivered to the storage box 42d.

In the case that the discharge confirming sensor 41c is ON when, although the tablet detecting sensor is OFF and the presence of the tablet T is not detected, a position on the carrying belt 31a where the presence of the tablet T is not detected is moved to the discharge confirming position by the discharge confirming sensor 41c, same as the handling of the defective product, the shutter 42a is closed to be in the closed state. When the target tablet T is stored by the shutter 42a to the storage box 42d of the re-inspection product collecting device 42, the shutter 42a is opened to be in the open state. In this way, an object detected by the discharge confirming sensor 41c without being detected by the tablet detecting sensor is treated as an unknown product. The unknown product is considered to be an object such as a fragment or powder of tablet T on the carrying belt 31a. The unknown product such as the fragment or powder of the tablet T need to be removed from the carrying belt 31a in order to prevent them from being collected together with the tablet T of the good product.

Further, an unknown product may be detected based on the result of the discharging sensor 41b and the blowing is performed. That is, in the case that the discharging sensor 41b is ON When, although the tablet detecting sensor is OFF and the presence of the tablet T is not detected, a position on the carrying belt 31a where the presence of the tablet T is not detected is moved to the detecting position by the discharging sensor 41b, the blowing is performed. This blowing is performed because there is a possibility that object such as the fragment or powder of the tablet T described above are present on the carrying belt 31a, and the object that may be present are removed from the carrying belt 31a. The object is treated as unknown product. After the blowing, in the case that the discharge confirming sensor 41c is ON when the position where the blowing is performed on the carrying belt 31a is moved to the discharge confirming position by the discharge confirming sensor 41c, the removal of the unknown product has failed, and the shutter 42a is closed to be in the closed state. When the target tablet T is stored by the shutter 42a to the storage box 42d of the re-inspection product collecting device 42, the shutter 42a is opened to be in the open state. In addition, after the blowing, in the case that the discharge confirming sensor 41c is OFF when the position where the blowing is performed on the carrying belt 31a is moved to the discharge confirming position by the discharge confirming sensor 41c, the unknown product has been successfully removed, and the shutter 42a remains open. In this way, by detecting the unknown product by the discharging sensor 41b, it is possible to perform the blowing, and the unknown product can be delivered to the storage box 41d of the defective product collecting device 41. That is, in addition to the collection in the storage box 42d of the re-inspection product collecting device 42, the collecting operation in the storage box 41d of the defective product collecting device 41 can be performed, so that the unknown product can be collected more reliably, and It is possible to prevent the tablet T other than the good product from mixing to the good product collecting device 43.

As described above, after the blowing is performed on the target tablet T, in the case that the discharge confirming sensor 41c is ON when the position where the blowing is performed on the carrying belt 31a is moved to the discharge confirming position by the discharge confirming sensor 41c, that is, when the target tablet T is not removed from the carrying belt 31a, the shutter 42a is closed. In addition, in the case that the discharge confirming sensor 41c is ON when, although the tablet detecting sensor is OFF, a position detected by the tablet detecting sensor on the carrying belt 31a is moved to the discharge confirming position by the discharge confirming sensor 41c, the shutter 42a is closed even when the blowing is not performed. The tablet T, which should have been removed from the carrying belt 31a by the blowing, however which is not removed, and the unknown product described above drop from the end of the carrying belt 31a on the side of each driven pulley 31c. The dropped tablet T is received by the shutter 42a in the closed state, moved along the shutter 42a, passed to the storage box 42d, and stored in the storage box 42d. That is, in the re-inspection product collecting device 42, the defective product or the unknown product detected by the discharge confirming sensor 41c is collected as a "re-inspection product". The tablet T to be performed the blowing is defective product or unknown product, and are tablet other than the good product.

When the shutter 42a rotates, the shutter detecting unit 42c may detect the stop position of the shutter 42a, and when the shutter 42a should be closed, it may detect that the shutter 42a fails and is not being in the closed state. For example, the shutter detecting unit 42c detects that the shutter 42a does not present at the predetermined stop position in which the shutter 42a is in the closed state within a predetermined time of several seconds after an instruction to close the shutter 42a is issued, and detects that the shutter 42a is not being in the closed state. In response to this detection, the control device 50 stops the drive of the supplying device 10 and stops the supply of the tablet T to the carrying belt 21a of the first printing device 20. Further, the control device 50 stops the drive of the carrying belt 21a of the first printing device 20 and the carrying belt 31a of the second printing device 30, and stops the supply of the tablet T to the belt of the discharging/carrying unit 43b (described later) of the good product collecting device 43. However, the control device 50 does not stop the drive of the suction device related to the suction chamber 21f of the first printing device 20 and the suction chamber 31f of the second printing device 30, and continues the suction holding of the tablet T.

(Printing Process)

Next, the printing process and the inspecting process performed by the tablet printing apparatus 1 will be described. In the following printing process, a double-sided printing will be described in which the identification information is printed on both sides of the tablet T having a dividing line formed on one side so as to be aligned with the dividing line (for example, parallel to the extending direction of the dividing line).

First, various information such as print data required for printing is stored in the storage unit 54 of the control device 50. Then, when a large number of target tablets T to be printed are put into the hopper 11 of the supplying device 10, the tablets T start to be sequentially supplied from the hopper 11 to the alignment feeder 12, and are arranged and moved in two rows by the alignment feeder 12. The tablets T moving in the two rows are sequentially supplied by the delivery feeder 13 to the carrying belt 21*a* of the first printing device 20. The carrying belt 21*a* is rotated in the carrying direction A1 by the rotation of the drive pulley 21*b* and each driven pulley 21*c* by the motor 21*d*. For this reason, the tablets T supplied onto the carrying belt 21*a* are carried in line on the carrying belt 21*a* in two rows at a predetermined moving speed. Note that the carrying belt 31*a* is rotated in the carrying direction A2 by the rotation of the drive pulley 31*b* and each driven pulley 31*c* by the motor 31*d*.

In the first printing device 20, the tablet T is suction-held on the carrying belt 21*a*, and the tablet T on the carrying belt 21*a* is detected by the detecting device 22. Thereby, the position information of the tablet T (a position in the carrying direction A1) is acquired and input to the control device 50. This position information of the tablet T is stored in the storage unit 54 and used in the post-processing. Next, the tablet T on the carrying belt 21*a* is imaged by the first imaging device 23 at timing based on the position information of the tablet T described above, and the imaged image is sent to the control device 50. Based on the individual images sent from the first imaging device 23, a positional deviation information of the tablet T (for example, the positional deviation of the tablet T in the X direction, the Y direction, and the θ direction in FIG. 2) is generated by the image processing unit 51, and stored in the storage unit 54. The printing condition (ink ejection position, ejection speed, etc.) for the tablet T is set by the print processing unit 52 based on the positional deviation information of the tablet T, and is stored in the storage unit 54.

Next, the printing is performed on the individual tablets T on the carrying belt 21*a* by the printing head device 24 based on the print data and printing conditions described above at the timing based on the position information of the tablet T described above, that is, at the timing when the tablets T reach below the printing head device 24. In each printing head 24*a* of the printing head device 24, ink is appropriately ejected from each nozzle 24*b*, and the identification information such as characters (for example, alphabets, katakana, numbers) and marks (for example, symbols and figures) are printed on the upper surface of the tablet T along with the dividing line (for example, parallel to the extending direction of the dividing line).

The tablet T printed with the identification information is imaged by the second imaging device 25 at timing based on the position information of the tablet T described above, and the imaged image is sent to the control device 50. Based on the individual images sent from the second imaging device 25, print position information indicating the print position of the print pattern for each tablet T is generated by the image processing unit 51, and stored in the storage unit 54. Based on the print position information, the inspection processing unit 53 determines whether or not the print quality of the tablet T is good (whether or not the tablet T is the good product), and the print quality result information indicating the result of the print quality of each tablet T (inspection result information) is stored in the storage unit 54. For example, the inspection processing unit 53 determines whether or not the print pattern is printed at a predetermined position on the tablet T in a predetermined pattern. The tablet T for which the print pattern is determined to be printed in the predetermined position on the tablet T in the predetermined pattern is regarded as the tablet T of the good product that has passed the inspection.

The tablet T after the inspection is carried along with the movement of the carrying belt 21*a* and passes above the drying device 26 during the drying operation. At this time, the ink that has reached (landed) the tablet T is dried by the drying device 26 while the tablet T passes above the drying device 26, and the tablet T with the dried ink is carried along with the movement of the carrying belt 21*a*, and is located near the end of the carrying belt 21*a* on the side of each driven pulley 21*c*. At this position, the suction action does not work on the tablet T, the tablet T is released from the state of being held by the lower surface of the carrying belt 21*a*, and is transferred from the first printing device 20 to the second printing device 30.

Also in the second printing device 30, the tablet T is suction-held on the carrying belt 31*a*, and the printing process and the inspecting process are performed as described above. The tablet T after the inspection is carried along with the movement of the carrying belt 31*a* and passes above the drying device 36 during the drying operation. Then, the tablet T with the dried ink reaches the defective product collecting device 41. At this position, the tablet T other than the good product (defective product or unknown product) drops from the lower surface of the carrying belt 31*a* by the gas spray (blowing) by the spraying nozzle 41*a*, and is collected by the storage box 41*d*. Further, the tablet T of the good product or the tablet T other than the good product that has not dropped from the carrying belt 31*a* despite receiving the blowing passes through the defective product collecting device 41 and reaches the position near the end of the carrying belt 31*a* on the side of each driven pulley 31*c*. At this position, the suction action does not work on the tablet T and the tablet T drops. In addition, since gas is blown onto the tablet T from above the tablet T by the gas blowing unit 43*a*, the tablet T surely drops from the carrying belt 31*a*. When the tablet T dropped from the carrying belt 31*a* is the tablet T other than the good product, the shutter 42*a* is in the closed state, and the dropped tablet T other than the good product reaches the upper surface of the shutter 42*a*, moves along the inclination of the upper surface, and flows into the storage box 42*d*, and is collected by the storage box 42*d*. The tablet T collected in the storage box 42*d* is treated as re-inspection product. On the other hand, when the tablet T dropped from the carrying belt 31*a* is a good tablet T, the shutter 42*a* of the re-inspection product collecting device 42 is in the open state, the dropped tablet T reaches the upper surface of the shutter 42*a* and moves along the upper surface, and flows into the discharging/carrying unit 43*b*.

The tablet T flowing into the discharging/carrying unit 43*b* are carried by the discharging/carrying unit 43*b*, and, on the way of carrying, the tablet T passes between the upper drying unit 43*c*1 and the lower drying unit 43*c*2 (a drying space) during the drying operation. Since the dry gas is blown from the upper drying unit 43*c*1 and the lower drying unit 43*c*2 to the tablet T on the belt of the discharging/carrying unit 43*b*, the ink on the tablet T is dried and the dried state of the tablet T is maintained. Even if the tablet T contains moisture due to humidity in the carrying path P which is upstream of the discharging/carrying unit 43*b*, the ink on the tablet T can be surely dried by the upper drying unit 43*c*1 and the lower drying unit 43*c*2 while the tablet T is carried by the discharging/carrying unit 43*b*. At this time, since the carrying speed of the discharging/carrying unit 43*b* is much slower than the carrying speed during printing, the tablet T on the belt slowly passes through the space of the dry gas for about ten and several minutes, the ink of the tablet T is surely dried. The tablet T dried by the drying device 43*c* is carried to a position above the storage box 43*d* by the discharging/carrying unit 43*b*, drops from the downstream end of the discharging/carrying unit 43*b*, and is collected in the storage box 43*d*.

In such printing process, the tablet T other than the good product (defective product or unknown product) drops from the lower surface of the carrying belt 31*a* by the gas spray by the spraying nozzle 41*a*, and is collected by the storage box 41*d* of the defective product collecting device 41. In addition, in the case that the tablet T other than the good product does not drop from the lower surface of the carrying belt 31*a* by the gas spray by the spraying nozzle 41*a*, the tablet T other than the good product is collected in the storage box 42*d* of the re-inspection product collecting device 42. That is, when the discharge confirming sensor 41*c* detects the target tablet T and detects that the target tablet T is not collected in the storage box 41*d*, the shutter 42*a* is changed from the open state to the closed state. The target tablet T that has reached the position near the end of the carrying belt 31*a* on the side of each driven pulley 31*c* drops from the carrying belt 31*a* due to the disappearance of the suction action and the blowing of the gas from the gas blowing portion 43*a*. At this time, since the shutter 42*a* is in the closed state, the tablet T dropped from the carrying belt 31*a* reaches the upper surface of the shutter 42*a*, moves along the inclination of the upper surface, and flows into the storage box 42*d* and is collected in the storage box 42*d*. In this manner, the tablet T other than the good product is reliably collected by the defective product collecting device 41 and the re-inspection product collecting device 42, and therefore the tablet T other than the good product is prevented from transferring to the good product collecting device 43 and being stored in the storage box 43*d* of the good product collecting device 43. Therefore, it is possible to prevent the tablet T other than the good product from being mixed in the storage box 43*d* which collects good tablet T.

Further, when the shutter detecting unit 42*c* detects that the shutter 42*a* is not closed when the shutter 42*a* is closed, the control device 50 recognizes that the shutter 42*a* breaks down. When it is recognized that the shutter 42*a* breaks down, the drive of the supplying device 10 is stopped, and the supply of the tablet T from the supplying device 10 to the carrying belt 21*a* of the first printing device 20 is stopped. Further, the drive of the carrying belt 21*a* of the first printing device 20 and the carrying belt 31*a* of the second printing device 30 is stopped, and the supply of the tablet T from the carrying belt 31*a* of the second printing device 30 to the belt of the discharging/carrying unit 43*b* of the good product collecting device 43 is stopped. As a result, even if the shutter 42*a* remains open due to a failure of the shutter 42*a*, it is possible to prevent the tablet T other than the good product from being supplied to the discharging/carrying unit 43*b*, and thus even when the shutter 42*a* breaks down, the tablet T other than the good product can be prevented from being collected in the storage box 43*d* of the good product collecting device 43. Therefore, even when the shutter 42*a* breaks down, it is possible to prevent the tablet T other than the good product from being mixed in the storage box 43*d* which collects good tablet T.

Here, although the supply of the tablet T is stopped and the drive of the respective carrying belts 21*a* and 31*a* is stopped (the suction is continued), the belt of the discharging/carrying unit 43*b* of the good product collecting device 43 is driven, and thus the good tablet T existing on the discharging/carrying unit 43*b* is automatically collected in the storage box 42*d*. As a result, the good tablet T can be collected without being affected by the stoppage of drive of the carrying belts 21*a* and 31*a*. It is also possible to stop drive of the belt of the discharging/carrying unit 43*b* and collect the good tablet T existing on the belt of the discharging/carrying unit 43*b* by a person. Further, as another control, it is also possible to stop the supply of the tablet T and perform printing on the tablets T existing on the carrying belts 21*a* and 31*a* at that time. The tablet T existing on the carrying belt 31*a* and the belt of the discharging/carrying unit 43*b* are automatically collected by the apparatus as described above or by a person.

As described above, according to the first embodiment, the defective product collecting device 41 collects the tablet T other than the good product, and in the case that the discharge confirming sensor 41*c* detects that the tablet T other than the good product is not collected, the tablet T other than the good product carried by the carrying belt 31*a* is collected by the re-inspection product collecting device 42. As a result, even if the tablet T other than the good product is not collected by the defective product collecting device 41 and remain on the carrying belt 31*a* as it is, such tablet T is collected by the re-inspection product collecting device 42. Therefore, since it becomes possible to prevent tablet T other than the good product from being collected by the storage box 43*d* of the good product collecting device 43, it is possible to prevent the tablet T other than the good product from being mixed in the storage box 43*d* which collects the tablet T of the good product.

Further, even if the shutter 42*a* is not being in the closed state due to a failure, the drive of the respective carrying belts 21*a* and 31*a* is stopped, it is possible to prevent the tablet T other than the good product from being mixed into the tablet T of the good product existing on the belt of the discharging/carrying unit 43*b*. When the tablet T other than the good product are supplied to the discharging/carrying unit 43*b* before the drive of the respective carrying belts 21*a* and 31*a* is stopped, although the tablets T other than the good product are mixed with the tablet T of the good tablet existing on the belt of the discharging/carrying unit 43*b*, by stopping the drive of the belt of the discharging/carrying unit 43*b*, it is possible to prevent tablet T other than the good product from mixing in the storage box 43*d* of the good product collecting device 43. In addition, in the case that the drive of the belt of the discharging/carrying unit 43*b* is stopped, only the tablet T existing on the belt of the discharging/carrying unit 43*b* is collected, and the tablet T other than the good product may be removed by performing re-inspection by a person or automatically by a device. That is, the number of tablet T to be re-inspected is small compared with the case where all the drive of the carrying belts 21*a* and 31*a* and the belt of the discharging/carrying unit 43*b* are not stopped, so that the work of removing the tablet T other than the good product can be performed efficiently.

Second Embodiment

The second embodiment will be described with reference to FIG. 3. Note that, in the second embodiment, differences from the first embodiment (the number of shutters, the number of belts of the discharging/carrying unit, and the belt arrangement) will be described, and the other description will be basically omitted.

Figure 3:
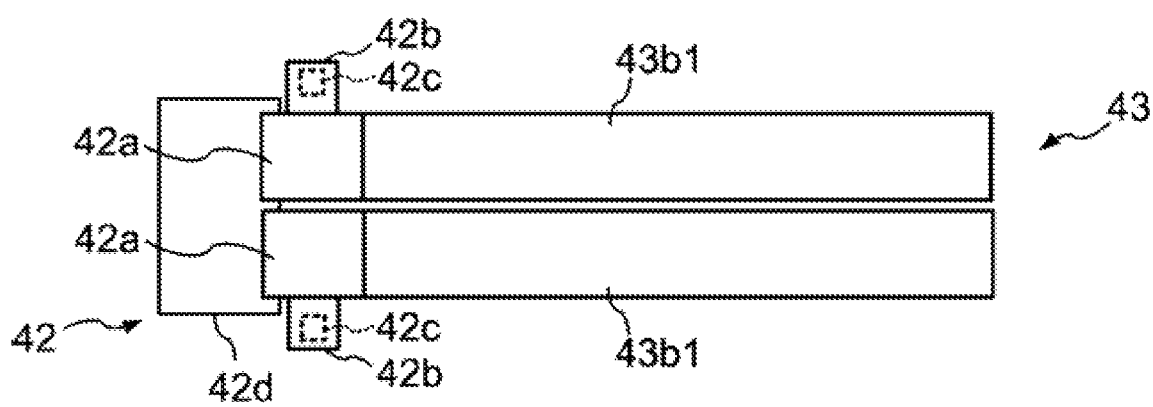
FIG. 3 is a plan view illustrating a shutter of a re-inspection product collecting apparatus and a discharge carrying unit of the good product collecting apparatus according to a second embodiment.

As shown in FIG. 3, the discharging/carrying unit 43b according to the second embodiment has a plurality of belts 43b1. Although two belts 43b1 are provided in FIG. 3, the number thereof is not particularly limited. These belts 43b1 can rotate individually to convey the tablets T, and the motor 42b and the shutter 42a are provided for each belt 43b1. The length in the width direction of the shutter 42a is substantially the same as the half length in the width direction of the carrying belt 31a. These shutters 42a are rotatably provided by motors 42b respectively, and a rotation shaft of each motor 42b is attached to a center of each shutter 42a in a short-length direction, respectively. Each motor 42b is a motor capable of normal rotation and reverse rotation. These motors 42b are electrically connected to the control device 50, and their drive are controlled by the control device 50. The shutter detecting unit 42c detects an individual stop position of each shutter 42a and detects whether or not each shutter 42a is in the closed state.

Here, when the shutter 42a rotates, the shutter detecting unit 42c may detect the stop position of the shutter 42a, and when the shutter 42a is closed, it may detect that the shutter 42a is not being in the closed state due to a failure. When the shutter detecting unit 42c detects that the shutter 42a is not being in the closed state, the control device 50 stops the drive of the supplying device 10, and continues the drives of the carrying belt 21a of the first printing device 20 and the carrying belt 31a of the second printing device 30, and stops only the belt 43b1 provided with the shutter 42a, which is detected by the shutter detecting unit 42c as not being in the closed state. As a result, the drive of the belt 43b1 provided with the broken shutter 42a is stopped, and it becomes possible to prevent the tablet T other than good tablets T from being collected from the belt 43b1 in the storage box 43d. Therefore, it is possible to prevent the tablet T other than the good product from being mixed to the tablet T of the good product. Further, since the belt 43b1 provided with the shutter 42a that has not broken down is driven as it is, it is possible to collect the tablet T of the good product on the belt 43b1 into the storage box 43d, so that the tablet T of the good product can be collected without being affected by the stoppage of the drive of the belt 43b1 on the side where the shutter 42a has broken down. In addition, the tablet T of the good product on the carrying belt 31a and the tablet T of the good product that will be printed and passed the inspection on each of the carrying belts 21a and 31a can be collected in the storage box 43d, the amount of the tablets T of the good products to be collected can be increased as compared with the case where the drives of all carrying system are stopped.

As described above, according to the second embodiment, the same effect as that of the first embodiment can be obtained. In addition, it is possible to prevent the tablet T other than the good product from being mixed in the storage box 43d which collects the tablet T of the good product, and since the tablet T of the good product can be collected in the storage box 43d, the collection rate of the tablet T of the good product is increased.

In addition, since the plurality of shutters 42a are provided, even if one shutter 42a is in the closed state, the other shutter 42a can perform collection in the open state, so that the tablets T on the belt 43b1 provided with the shutter 42a in the open state can be collected, the collecting operation can be continued, thus the collection rate of the tablet T of the good product can be increased.

In addition, even if the tablet T other than the good product is mixed with the tablet T of the good product existing on the one belt 43b1 due to the failure of the shutter 42a, only the tablet T existing on the belt 43b1 on the failure side of the shutter 42a is collected, and the tablet T other than the good product can be removed by performing re-inspection by a person or automatically by a device. The tablet T existing on the other belt 43b1 (the side where the shutter 42a does not break down) does not need to be inspected again. That is, the number of tablet T to be re-inspected is small compared with the case where there is only one shutter 42a and belt 43b1, so that the work of removing the tablet T other than the good product can be performed efficiently.

Third Embodiment

The third embodiment will be described with reference to FIG. 4. Note that, in the third embodiment, difference from the first embodiment (the number of the discharging/carrying unit) will be described, and the other description will be basically omitted.

Figure 4:
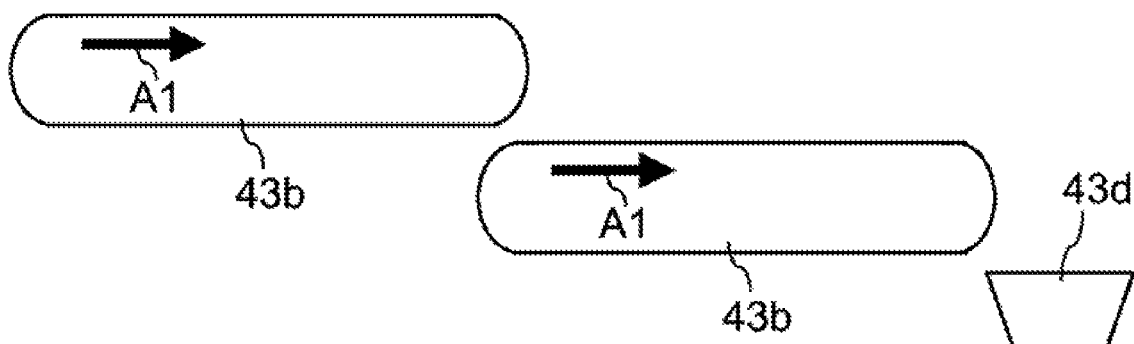
FIG. 4 is a diagram illustrating the discharge carrying unit and a storage box of the good product collecting apparatus according to a third embodiment.

As shown in FIG. 4, the discharging/carrying unit 43b according to the third embodiment is provided with two overlapping portions in the vertical direction. Although two discharging/carrying units 43b are provided in FIG. 4, the number thereof is not particularly limited. These discharging/carrying units 43b are arranged side by side in the carrying direction A1 so that the tablet T can be delivered from the upstream side to the downstream side in the carrying direction A1.

Here, when the shutter 42a rotates, the shutter detecting unit 42c may detect the stop position of the shutter 42a, and when the shutter 42a is closed, it may detect that the shutter 42a fails and is not being in the closed state. When the shutter detecting unit 42c detects that the shutter 42a is not being in the closed state, the control device 50 stops the drive of the supplying device 10, and stops the drives of the carrying belt 21a of the first printing device 20 and the carrying belt 31a of the second printing device 30, and stops only the drive of the belt of the most upstream discharging/carrying unit 43b in the carrying direction A1 among the respective discharging/carrying units 43b. As a result, the tablets T of the good product on the belt of the discharging/carrying unit 43b whose drive is not stopped can be collected in the storage box 43d, the amount of the tablets T of the good products to be collected can be increased as compared with the case where the drive of all the belts of the discharging/carrying unit 43b is stopped.

As described above, according to the third embodiment, the same effect as that of the first embodiment can be obtained. In addition, it is possible to prevent the tablet T other than the good product from being mixed in the storage box 43d which collects the tablet T of the good product, and since the tablet T of the good product can be collected in the storage box 43d, the collection rate of the tablet T of the good product is increased.

In addition, even if the tablet T other than the good product is mixed with the tablet T of the good product existing on the belt of the discharging/carrying unit of the upstream side due to the failure of the shutter 42a, only the tablet T existing on the belt of the discharging/carrying unit of the upstream side is collected, and the tablet T other than the good product may be removed by performing re-inspection by a person or automatically by a device. The tablet T existing on the belt of the discharging/carrying unit 43b of the downstream side does not need to be inspected again.

That is, the number of tablet T to be re-inspected is small compared with the case where there is only one discharging/carrying unit 43b, so that the work of removing the tablet T other than the good product can be performed efficiently.

OTHER EMBODIMENTS

In the above description, the tablet T is printed using the tablet printing apparatus 1 according to any of the above-described embodiments. This can be rephrased to print the tablets T using the tablet printing apparatus 1 according to any of the above-described embodiments to manufacture the printed tablets T.

Further, in the above description, the inkjet type printing head device is illustrated as the printing head devices 24 and 34, however the present disclosure is not limited to this, and for example, a transfer type printing head device using a transfer roll or a transfer pad may be used.

Further, in the above description, the shutter 42a is made to have a gentle slope to weaken the impact when the dropped tablet T collides with the belt, however the present disclosure is not limited to this, and for example, a gas (for example, air) may be blown in a direction opposite to a dropping direction of the tablets T to weaken the impact when the dropped tablets T collide with the belt.

Further, in the above description, it is illustrated that the inspection result information is generated depending on whether the print quality of the tablet T is good or bad, however, the present disclosure is not limited to this, and it may be possible to include the quality of the tablet T such as chipping, cracking, dirt, and poor posture.

Further, as the shutter 42a, one shutter 42a may be provided in common to all the carrying paths P, or a shutter 42a may be provided for each of the plurality of carrying paths P. Since the tablet T may be damaged such as chipped or cracked by dropping the tablet, the chances of the tablet T being damaged increases by performing the re-inspection. Therefore, it is more preferable to provide the shutter 42a for each of the carrying paths P, and by providing the shutter 42a for each of the carrying paths P, it is possible to reduce the number of tablets T stored, since it reached the shutter 42a at the same timing as the re-inspection product, although it is the good product that does not need to be re-inspected, in the storage box 42d of the re-inspection product collecting device 42, thus it is possible to reduce the number of damaged tablets T.

Further, in the above description, the determination of performing the blowing of the tablet T based on the detection result of "tablet detecting sensor ON/OFF" (presence/absence of the tablet T) by the detecting sensor which is the detecting unit of the detecting device 32 (similar to the detecting unit 22a of the detecting device 22) is illustrated, however the present disclosure is not limited to this, the detection result of "tablet detecting sensor ON/OFF" by the detecting unit 22a of the detecting device 22 may be included.

Further, even though the tablet T is not detected by the detecting unit 22a of the detecting device 22, when the position on the carrying belt 31a corresponding to the position where the presence of the tablet T is not detected by the detecting unit 22a moves below the detecting unit of the detecting device 32 and the tablet T is detected, the printing may not be performed on the tablet T, and the collecting operation may be performed as "unknown product".

Further, in the above description (refer to the second embodiment), the provision of the plurality of belts 43b1 and the provision of the shutter 42a for each belt 43b1 are illustrated, however the present disclosure is not limited to this, and a plurality of only one of the shutter 42a and the belt 43b1 may be provided.

In the above description, it is illustrated that the tablets T are carried in two rows, however the present disclosure is not limited to this, and the number of rows may be one row, or three rows or four rows or more, and the number of the carrying paths P and the number of carrying belts 21a and 31a are not particularly limited. Also, the shape of the suction holes 21g of the carrying belts 21a and 31a is not particularly limited.

Further, in the above description, it is illustrated that the printing head 24a is provided for each carrying path P, however the present disclosure is not limited to this, and for example, one printing head 24a may print on two or more rows of tablets T.

Further, in the above description, it is illustrated that, as the inkjet printing head 24a, a printing head in which the nozzles 24b are arranged in a line, however the present disclosure is not limited to this, and for example, a printing head in which the nozzles 24b are arranged in a plurality of lines may be used. Further, a plurality of printing heads 24a may be arranged and used along the carrying direction A1.

Further, in the above description, it is illustrated that the drying devices 26, 36, 43c are provided, but the number thereof is not limited. For example, it is sufficient if there is not one drying device 26 and there are two drying devices 36 and 43c, if there is not two drying device 26 and 36 and there is one drying device 43c, and if there is not a drying device 43c and there are drying devices 26 and 36. Further, depending on the type of ink or tablet T, a drying device may not be required, thus all three drying devices 26, 36, 43c may be omitted.

Further, in the above description, it is illustrated the first printing device 20 and the second printing device 30 are arranged so as to be vertically stacked, and both sides or one side of the tablet T is printed, however the present disclosure is not limited to this, and for example, only the first printing device 20 may be provided and only one side of the tablet T may be printed.

Here, the above-described tablet T can include tablets used for medicine, food and drink, washing, industrial use or aromatization. In addition, as tablets, plain tablets (uncoated tablets), sugar-coated tablets, film-coated tablets, enteric-coated tablets, gelatin-coated tablets, multilayer tablets, dry-coated tablets, and various capsule tablets such as hard capsules and soft capsules may be included. Further, the tablet shape includes various shapes such as a disk shape, a lens shape, a triangle shape, and an oval shape. When the tablet to be printed is for medicine or food and drink, edible ink is suitable as the ink to be used. As the edible ink, any of synthetic dye ink, natural dye ink, dye ink, and pigment ink may be used.

Although some embodiments of the present disclosure have been described above, these embodiments are presented as examples and are not intended to limit the scope of the invention. These novel embodiments can be implemented in various other forms, and various omissions, replacements, and changes can be made without departing from the spirit of the invention. These embodiments and their modifications are included in the scope and gist of the invention, and are also included in the invention described in the claims and the scope of equivalents thereof.

What is claimed is:

1. A tablet printing apparatus, comprising:
a carrying belt carrying a tablet;
a printing head device printing on the tablet carried by the carrying belt;
an inspection unit determining whether or not the tablet carried by the carrying belt is a good product;
a good product collecting device collecting the tablet of the good product carried by the carrying belt when the tablet is determined as the good product by the inspection unit;
a defective product collecting device collecting the tablet other than the good product carried by the carrying belt when the tablet is not determined as the good product by the inspection unit;
a detecting unit detecting whether or not the tablet other than the good tablet is collected by the defective product collecting device; and
a re-inspection product collecting device collecting the tablet other than the good product carried by the carrying belt when a collecting operation for collecting the tablet other than the good product is performed by the defective product collecting device, and the detecting unit detects that the tablet other than the good tablet is not collected.

2. A tablet printing apparatus according to claim 1:
wherein the re-inspection product collecting device comprising:
a storage box storing the tablet other than the good product;
a shutter provided being openable and closable, and, in a closed state, receiving the tablet other than the good product dropped from the carrying belt and delivering it to the storage box, and, in an open state, receiving the tablet of the good product dropped from the carrying belt and delivering it to the good product collecting device; and
a shutter detecting unit detecting whether or not the shutter is in the closed state;
wherein the tablet printing apparatus further comprising a control device stopping a supply of the tablet to the carrying belt in the case that the defective product collecting device performs the collection operation, the detecting unit detects that the tablet other than the good product is not collected, and the shutter detecting unit detects that the shutter is not in the closed state.

3. A tablet printing apparatus according to claim 2, wherein the control device stops the drive of the carrying belt in the case that the defective product collecting device performs the collection operation, the detecting unit detects that the tablet other than the good product is not collected, and the shutter detecting unit detects that the shutter is not in the closed state.

4. A tablet printing apparatus according to claim 2, wherein:
the good product collecting device comprising a good product carrying belt receiving and carrying the tablet of the good product from the carrying belt; and
the control device stops the drive of the good product carrying belt in the case that the defective product collecting device performs the collection operation, the detecting unit detects that the tablet other than the good product is not collected, and the shutter detecting unit detects that the shutter is not in the closed state.

5. A tablet printing apparatus according to claim 4, wherein:
a plurality of the good product carrying belt is arranged in a direction orthogonal to the carrying direction of the tablet in a horizontal plane;
the shutter and the shutter detecting unit are provided for each good product carrying belt; and
the control device stops only the drive of the good product carrying belt provided with the shutter detected by the shutter detecting unit as not being in the closed state.

6. A tablet printing apparatus according to claim 4, wherein:
a plurality of the good product carrying belt is arranged in the carrying direction of the tablet; and
the control device stops only the drive of the most upstream good product carrying belt in the carrying direction of the tablet among the plurality of the good product carrying belts.

7. A tablet printing apparatus, comprising:
a carrying belt carrying a tablet;
a printing head device printing on the tablet carried by the carrying belt;
a tablet detecting sensor arranged on an upstream side of a carrying direction of the tablet with respect to the printing head device and detecting a position of the tablet;
an inspection unit determining whether or not the tablet carried by the carrying belt is a good product;
a defective product collecting device collecting the tablet other than the good product carried by the carrying belt when the tablet is not determined as the good product by the inspection unit;
a detecting unit arranged on an downstream side of the carrying direction of the tablet with respect to the defective product collecting device and detecting the tablet passed through the defective product collecting device; and
a re-inspection product collecting device collecting the tablet carried by the carrying belt when the presence of the tablet is detected by the detecting unit even though the tablet is not detected by the tablet detecting sensor.

8. A tablet printing apparatus according to claim 7, wherein:
the defective product collecting device comprising an spraying nozzle performing a blowing to remove the tablet from the carrying belt, and a discharging sensor located the upstream side of the spraying nozzle in the carrying direction of the tablet; and
the spray nozzle performs the blowing when the presence of the tablet is detected by the discharging sensor even though the tablet is not detected by the tablet detecting sensor.

9. A tablet printing method, comprising the following steps of:
carrying a tablet by a carrying belt;
printing, by a printing head device, on the tablet carried by the carrying belt;
determining, by an inspection unit, whether or not the tablet carried by the carrying belt is a good product;
collecting, by a good product collecting device, the tablet of the good product carried by the carrying belt when the tablet is determined as the good product by the inspection unit;
collecting, by a defective product collecting device, the tablet other than the good product carried by the carrying belt when the tablet is not determined as the good product by the inspection unit;

detecting, by a detecting unit, whether or not the tablet other than the good tablet is collected by the defective product collecting device; and collecting, by a re-inspection product collecting device, the tablet other than the good product carried by the carrying belt when a collecting operation for collecting the tablet other than the good product is performed by the defective product collecting device, and the detecting unit detects that the tablet other than the good tablet is not collected.

10. A tablet printing apparatus according to claim 3, wherein:

the good product collecting device comprising a good product carrying belt receiving and carrying the tablet of the good product from the carrying belt; and the control device stops the drive of the good product carrying belt in the case that the defective product collecting device performs the collection operation, the detecting unit detects that the tablet other than the good product is not collected, and the shutter detecting unit detects that the shutter is not in the closed state.

* * * * *